(12) United States Patent
Yamane et al.

(10) Patent No.: US 6,574,438 B2
(45) Date of Patent: Jun. 3, 2003

(54) MOTOR DRIVE CAMERA

(75) Inventors: Kenji Yamane, Saitama (JP); Toru Ito, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/184,871

(22) Filed: Jul. 1, 2002

(65) Prior Publication Data

US 2003/0002875 A1 Jan. 2, 2003

(30) Foreign Application Priority Data

Jun. 29, 2001 (JP) .......................... 2001-200130

(51) Int. Cl.[7] .......................... G03B 17/00; G03B 13/34
(52) U.S. Cl. .......................... 396/85; 396/133; 396/418
(58) Field of Search .................. 396/133, 387, 396/411, 418, 132, 85

(56) References Cited

U.S. PATENT DOCUMENTS 4,579,435 A * 4/1986 Haraguchi .................. 396/410
5,768,636 A   6/1998 Ohmiya
6,190,059 B1 * 2/2001 Kato et al. .................. 396/418

FOREIGN PATENT DOCUMENTS

JP     09-211644     8/1997

* cited by examiner

*Primary Examiner*—David Gray
(74) *Attorney, Agent, or Firm*—Young & Thompson

(57) ABSTRACT

A zoom lens device is attached in front of a main body. The main body has a film cartridge chamber and a take-up chamber. A take-up spool is rotatably positioned into the take-up chamber. The zoom lens device consists of a fixed lens barrel and plural movable lens barrels. The movable lens barrels move along a photographic optical axis in order to perform zooming. Rotation of a film motor is transmitted to the take-up spool through a film advance gear train. Rotation of the lens motor is transmitted to the zoom lens device through a lens drive gear train. The film advance gear train and the lens drive gear train are positioned side by side on the lower part of the main body.

7 Claims, 6 Drawing Sheets

MOTOR DRIVE CAMERA

BACKGROUND OF THE INVENTION

1. Field of the Invention

The present invention relates a motor drive camera.

2. Description of the Prior Arts

In a camera having a zoom lens device, as disclosed in JPA No. 9-211644, the zoom lens device is driven by a lens motor so as to perform zooming and focusing. The rotating force of the lens motor is transmitted to the zoom lens device through a reduction gear train. The zoom lens device consists of a fixed lens barrel and at least one movable lens barrel, both of which are connected by helicoids. When the movable lens barrel is rotated by the lens motor, the zoom lens system moves in a direction of optical axis. The zooming position and the focusing position are controlled by the number of revolutions of the lens motor.

In most compact cameras, a photographic film is automatically wound and rewound by a film motor. The film motor is provided separate from the lens motor. The film advance gear train is also provided separate from the lens drive gear train. A spool inside a film cartridge and a take-up spool in a film take-up chamber are perpendicular to the optical axis of the zoom lens device. Therefore an output shaft of the film motor and each shaft of the film advance gear train are perpendicular to the optical axis of the zoom lens device. For that reason, the film advance gear train is formed upside or downside (bottom side) of the camera body. It is usual to arrange the film advance gear train on the bottom side of the camera body because a finder and a flash device are generally located upside the camera body.

According to the camera as disclosed in JPA No. 9-211644, the output shaft of the lens motor and the shafts constituted of the lens driven gear train are disposed parallel to the optical axis. And this lens driven gear train is disposed forward into the camera body. Therefore, in case the film motor as well as the lens motor is disposed inside the camera body, the gear train is positioned on the front side and the bottom side of the camera body. This results in an increase of the camera body in thickness and height. In addition to that, each gear train must be attached separately upon manufacturing the camera as the gear train is disposed on the front side and the bottom side inside the camera body. This makes it complicated to assemble. Moreover, this increases the number of parts because a press cover for preventing gear from slipping is provided for each gear train.

SUMMARY OF THE INVENTION

A main object of the present invention is to provide a motor drive camera that realizes to reduce the size of a camera body.

Another object of the present invention is to provide a motor drive camera to which two gear trains are easily attached.

Further object of the present invention is to provide a motor drive camera that requires a small number of parts.

To achieve the above and other objects, the film advance gear train and the lens driven gear train are arranged side by side on the bottom side of the camera body. These two gear trains include plural spur gears, and their shafts cross with a photographic optical axis.

In order to move a movable lens barrel forward or backward, a worm gear or a bevel gear is used on the rear row of the lens drive gear train, for twisting surface of revolution at 90 degrees. In order to reduce an installation space of the lens motor that drives the movable lens barrel, the lens motor is attached to the bottom part of the camera body with the motor output shaft parallel to the photographic optical axis. And a main capacitor of a flash device and a power battery are disposed in parallel to an axial direction of the lens motor. Furthermore, the main capacitor and the power battery are positioned adjacent to the upper part of the lens motor.

According to the present invention, these installation space can be reduced by arranging the lens driven gear train and the film advance gear train on one surface. And the gear installation work is streamlined by attaching the lens driven gear train and the film advance gear train together. Moreover, the number of parts is decreased, as just one cover is required for preventing these gear trains from being slipped.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE PREFERRED EMBODIMENTS

Figure 1:
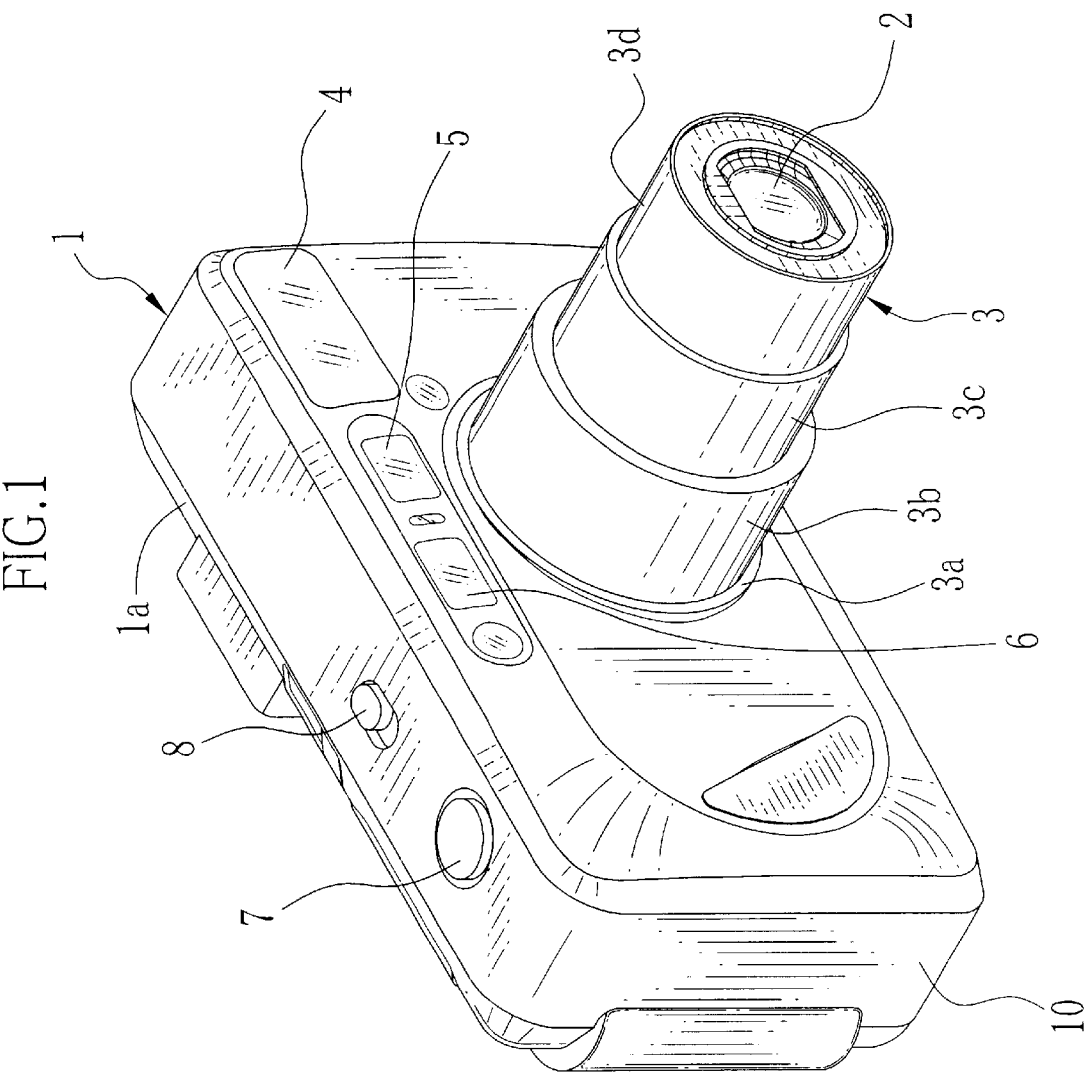
FIG. 1 is a front perspective view of a camera of the present invention.

In FIG. 1, a camera body 1 consists of a main body 9 (see FIG. 2), a front cover 10 attached in front and a rear cover 1a attached behind. A well-known rear lid (not shown), which is free to open and close, is attached to the rear cover 1a. A zoom lens device 3 constituted of a fixed lens barrel 3a and movable lens barrels 3b–3d are attached in front of the camera body 1. A taking lens 2 is held into the movable lens barrel 3d. A flash projector 4, a finder window 5, and a photometry window 6 are provided in front of the camera body 1. A release button 7 and a zoom switch 8 are provided on the top of the camera body 1. On operating the zoom switch 8, the movable lens barrels 3b–3d are projected forward, to perform zooming. It is possible in this embodiment to perform telephotography of maximum 3 magnifications.

Figure 2:
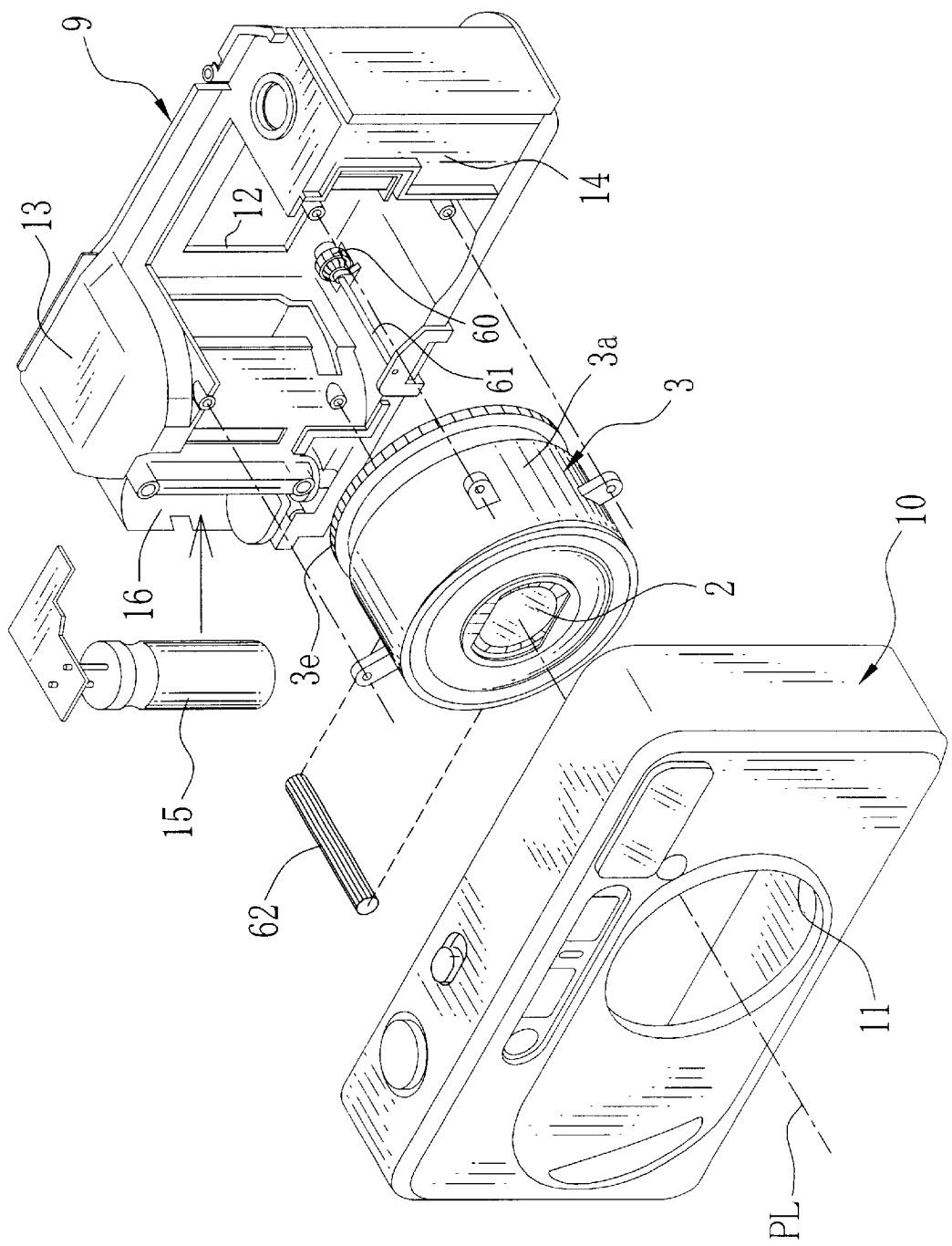
FIG. 2 is an exploded view of the camera shown in FIG. 1, with a rear cover being omitted.

In FIG. 2, the zoom lens device 3 is fitted to an opening 11 of the front cover 10 by screwing the fixed lens barrel 3a to the main body 9 securely. A finder optical system and a photometry element (neither is shown) are attached to the upper part of the main body 9. An exposure aperture 12 is formed at the approximate center of the main body 9. There are a cartridge chamber 13 and a film take-up chamber 14 on either side of the exposure aperture 12. There is a capacitor chamber 16 for containing a main capacitor 15 of the flash device outside the cartridge chamber 13. The main capacitor 15 has approximately column shape, and it is contained into the capacitor chamber 16 in vertical posture.

Figure 3:
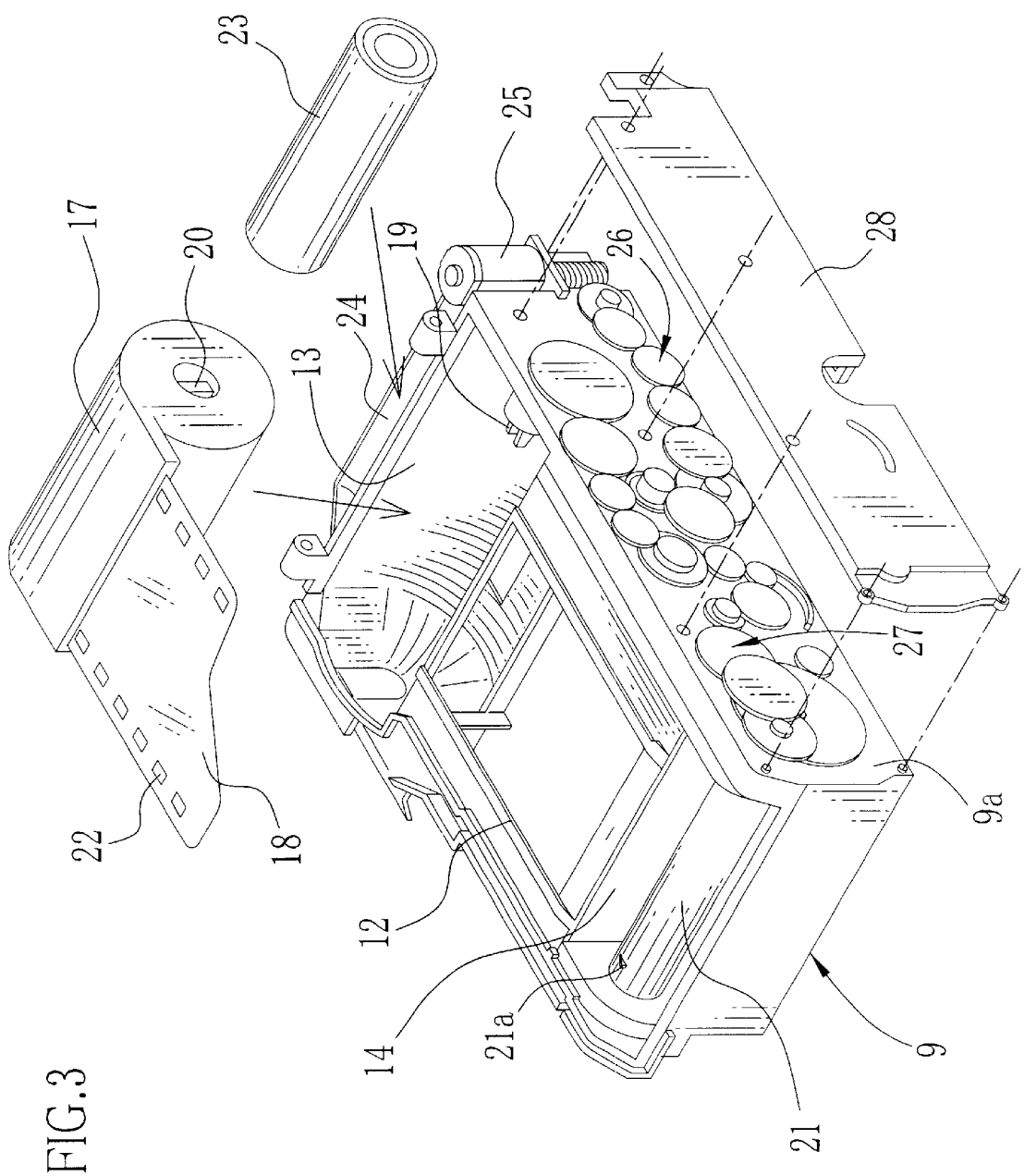
FIG. 3 is a front perspective view of a main body with a gear cover removed.

As shown in FIG. 3, a film cartridge 17 is removably loaded into the cartridge chamber 13. A rewind fork 19 is disposed in the cartridge chamber 13, for being engaged with an end 20 of a spool in the film cartridge 17. The rewind fork 19 is rotated to rewind an exposed photographic film 18 around the spool of the film cartridge 17. A take-up spool 21 is provided in the cartridge chamber 13 in a rotatable manner. Periphery of the take-up spool 21 has a detent 21a for being engaged with a perforation 22 of the photographic film 18. When the take-up spool 21 rotates, the photographic film 18 is pulled from the film cartridge 17 to be wound around the take-up spool 21.

The main body 9 has a battery chamber 24 for containing a power battery 23 outside the cartridge chamber 13. This battery chamber 24 is lined parallel to the photographic optical axis PL (See FIG. 2) behind the capacitor chamber 16. The power battery 23 is vertically contained in the same way as the main capacitor 15. Just under the capacitor chamber 16 and the battery chamber 24, a lens motor 25 for driving the zoom lens device 3 is positioned in parallel with the photographic optical axis PL.

A lens drive gear train 26 for transmitting rotational force of the lens motor 25 and a film advance gear train 27 are disposed side by side on a bottom surface 9a of the main body 9. Each axis of the lens drive gear train 26 and the film advance gear train 27 is perpendicular to the bottom surface 9a of the main body 9, and a gear cover 28 is covered thereon, so as to prevent the gears from slipping out of the axis. This gear cover 28 is secured to the main body 9.

Figure 4:
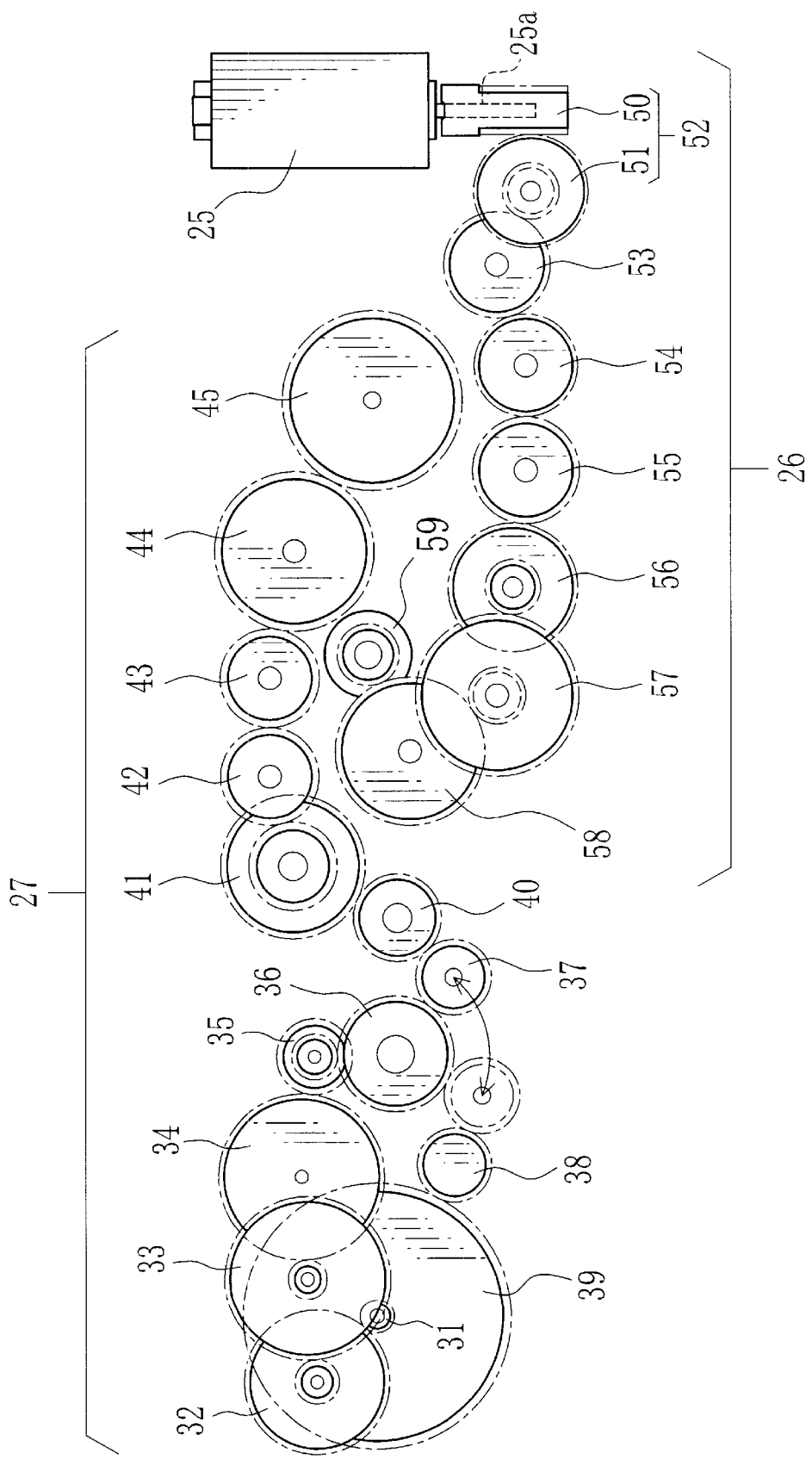
FIG. 4 is a top plan view illustrating a lens drive gear train and a film advance gear train.
Figure 5:
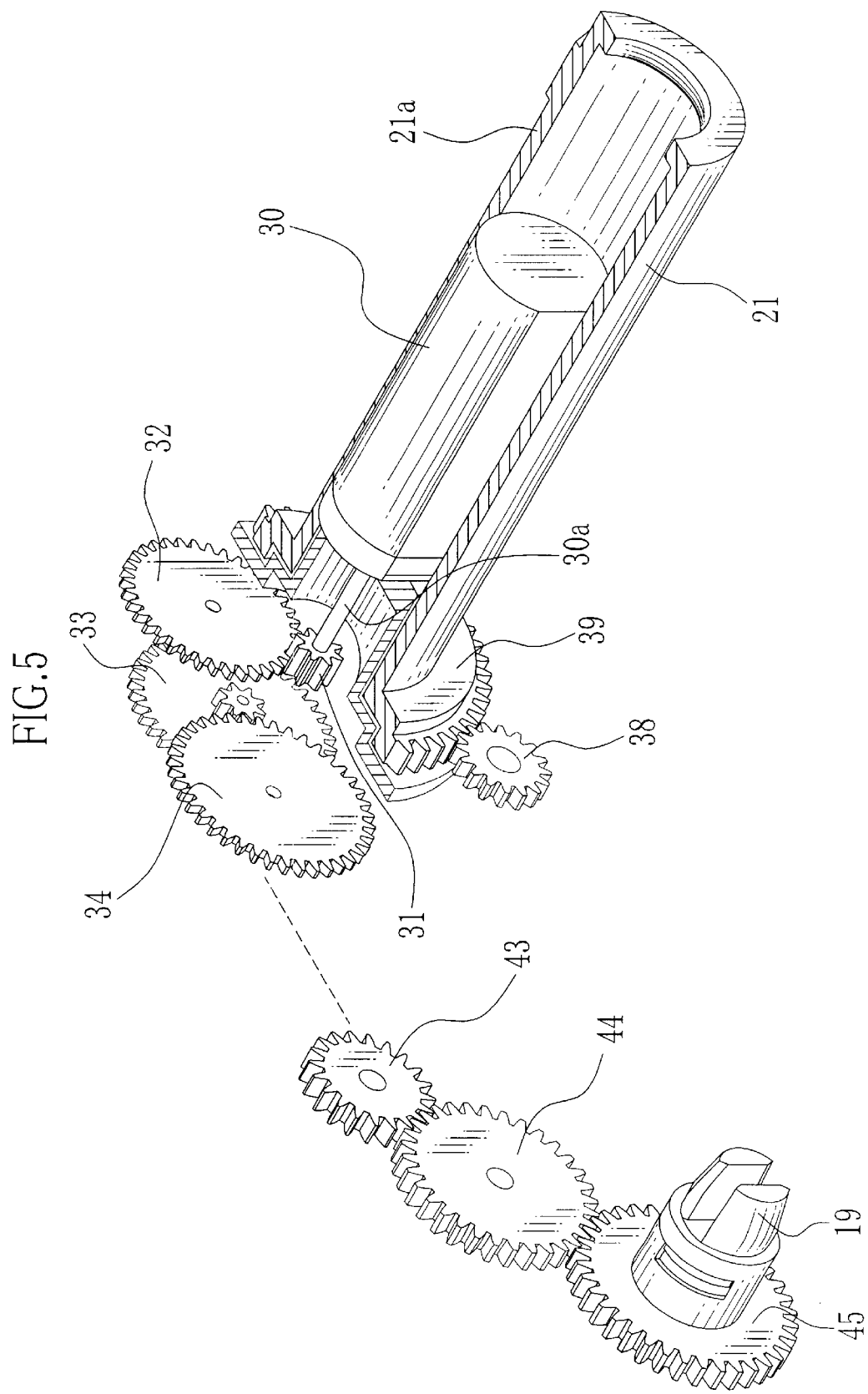
FIG. 5 is a front perspective view illustrating a film advance system.

In FIGS. 4 and 5, a film motor 30 is contained into the take-up spool 21. And an output shaft 30a of the film motor 30 has a pinion gear 31. Rotational speed of the pinion gear 31 is reduced by plural spur gears 32–35 and transmitted to a planetary gear 37 through a sun gear 36. The planetary gear 37 functions as a clutch by changing an orbital direction in accordance with rotatory direction of the film motor 30.

The film feed system consists of the film motor 30, the take-up spool 21, the film advance gear train 27, and the rewind fork 19. Upon forward rotation of the film motor 30, rotation of the film motor 30 is transmitted to the take-up spool 21. Upon reverse rotation of the film motor 30, rotation of the film motor 30 is transmitted to the rewind fork 19. That is, when the film motor 30 rotates forward, the planetary gear 37 is engaged with a spur gear 38 to rotate a take-up gear 39. Since this take-up gear 39 is fixed to the take-up spool 21, the take-up spool 21 makes rotation. Contrary to this, when the film motor 30 rotates reversely, the planetary gear 37 is engaged with a spur gear 40, transmitting its rotation to a rewind gear 45 through spur gears 41–44. Since the rewind gear 45 is fixed to a shaft of the rewind fork 19, the rewind fork 19 makes reverse rotation, to perform film rewinding.

Figure 6:
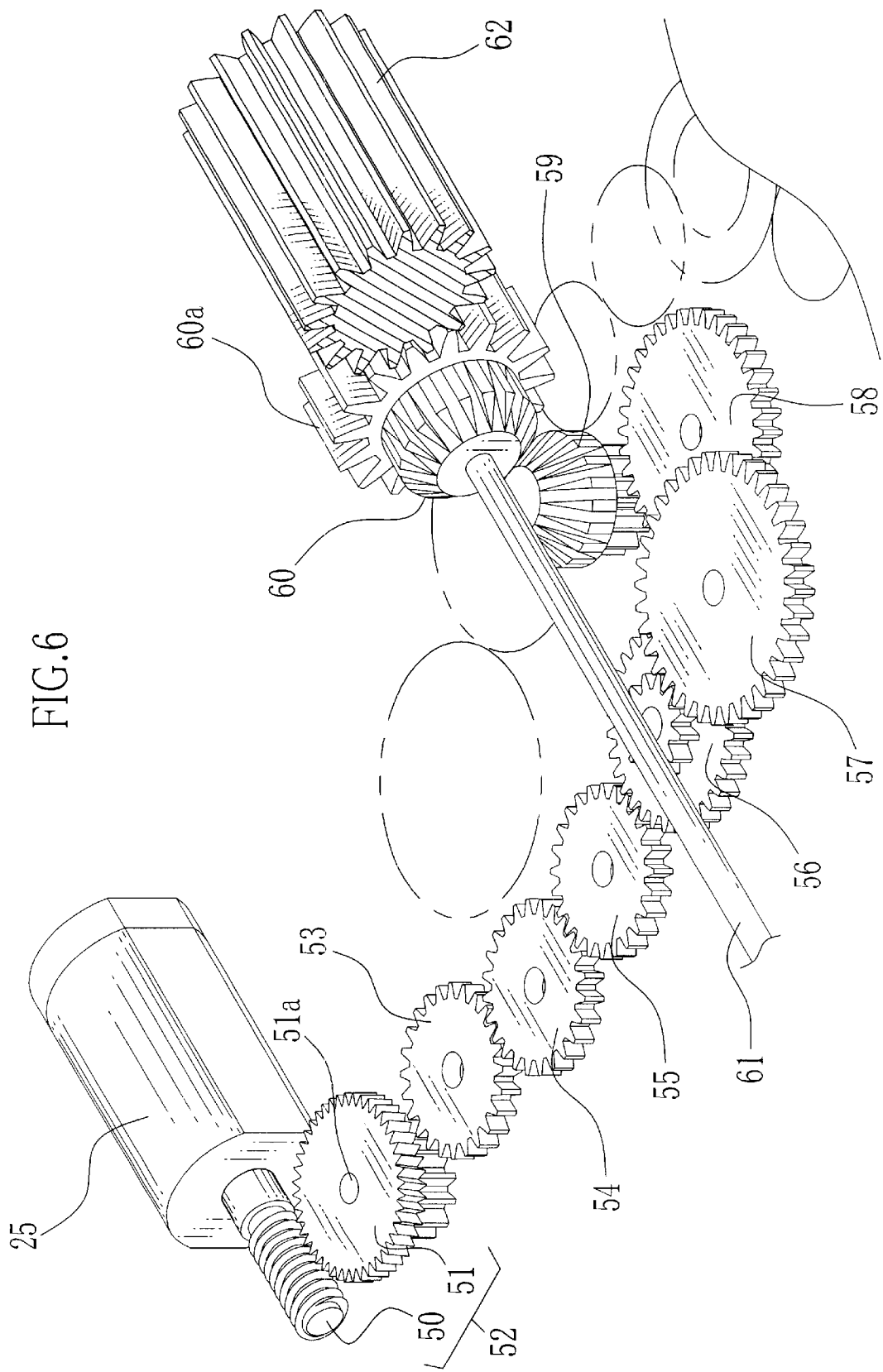
FIG. 6 is a front perspective view illustrating a lens drive system.

In FIGS. 4 and 6, a worm 50 is attached to an output shaft 25a of the lens motor 25. Concerning a worm wheel 51 to be engaged with the worm 50, its rotating shaft 51a is parallel to the rotating shafts of the respective film advance gear train 27. When the lens motor 25 rotates, the speed is reduced at spur gears 53–58 through a worm gear 52, made up of the worm 50 and the worm wheel 51, and transmitted to a bevel gear 59. The worm gear 52 and the spur gears 53–58 are, in line with the film advance gear train 27, attached to the lower surface 9a of the camera body 9. The bevel gear 59 and a bevel gear 60 to be engaged therewith cross each shaft at an angle of 90 degrees. A shaft 61 of the bevel gear 60 is parallel with the photographic optical axis PL. A spur gear 60a is formed integral with the bevel gear 60. The spur gear 60a is engaged with a spline gear 62. A shaft of the spline gear 62 is supported by the main body 9 and the fixed lens barrel 3a of the lens barrel 3. And the spline gear 62 is engaged with a gear section 3e (see FIG. 2) formed in the movable lens barrel 3b.

The lens drive system consists of the lens motor 25 and the lens drive gear train 26. Rotation of the lens motor 25 is transmitted to the zoom lens device 3 through the lens drive gear train 26, so that the movable lens barrel 3b rotates into the fixed lens barrel 3a. When this movable lens barrel 3b makes rotation, as is generally known, the movable lens barrels 3b–3d move forward and backward along the photographic optical axis PL.

Then, the operation of the above embodiment is explained. The back lid is opened in order to load the film cartridge 17 into the cartridge chamber 13 and overlap a film leader pulled from the film cartridge 17 on the take-up spool 21. When the back lid is closed, the control circuit (not shown), in receipt of signals from the film loading detection switch and the back lid close detection switch, rotates the film motor 30 forward. This forward rotation of the film motor 30 is transmitted to the take-up spool 21 through the film drive gear train 27. Upon rotation of the take-up spool 21, the photographic film 18 is pulled from the film cartridge 17 to be wound around the take-up spool 21. When the first frame is set behind the exposure aperture 12 while winding the film, the film motor 30 stops. And in cooperation with the film winding, the shutter device is charged.

When the power switch (not shown) is turned on, the lens motor 25 rotates forward. Rotation of the lens motor 25 is transmitted to the bevel gear 59 while twisting a surface of revolution for 90 degrees and reducing speed by the spur gears 53–58. The surface of revolution is restored by the bevel gears 59–60, then the rotation of the lens motor 25 is transmitted to the spline gear 62 through the spur gear 60a. This spline gear 62 rotates the movable lens barrel 3b through the gear section 3e. When the zoom lens device 3 is set in a state of wide-angle photography, the lens motor 25 stops automatically.

In case of telephotography, the zoom switch 8 is operated to a telephoto side. The lens motor 25 rotates forward. Rotation of the lens motor 25 is transmitted to the zoom lens device 3, so as to project the movable lens barrels 3b–3d along the photographic optical axis PL. Observing a photographic scene through the finder 5, the zoom switch 8 is stopped to operate at a desired zoom magnification. Contrary to this, the zoom switch 8 is operated to the wide-angle side. The lens motor 25 rotates reversely. Since the movable lens barrels 3b–3d are retracted, zooming is performed towards the wide-angle side.

When the release button 7 is depressed after framing, the shutter device is activated. Passing through the taking lens 2, light becomes incident upon the photographic film 18 through the exposure aperture 12. When the first frame is exposed, the film motor 30 starts automatical rotation to take up the photographic film 18 as mentioned above. The exposed part of the photographic film 18 is wound around the take-up spool 21, then the second frame is set behind the exposure aperture 12.

By taking pictures repeatedly like this, all frames of the photographic film 18 are taken. The film motor 30 starts reverse rotation automatically at this time. Rotation of the film motor 30 is transmitted to the rewind fork 19 by the planetary clutch mechanism. When this rewind fork 19 makes rotation, the spool 20 of the film cartridge 17 rotates reversely. The exposed photographic film 18 is reversed from the take-up spool 21, to be rewound into the film cartridge 17.

The lens motor 25 may perform focusing in place of zooming. In case of the step zoom lens device, the lens motor 25 performs both zooming and focusing. Furthermore, it is possible to provide a zoom motor, a focus motor, a zooming gear train, and a focusing gear train respectively. And finally, it is also suitable to use feed screw mechanism so as to move the taking lens back and forth.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera having a main body and a lens device, said main body having a cartridge chamber for loading a photographic film cartridge and a take-up chamber for disposing a take-up spool, said lens device having at least one movable lens barrel which moves back and forth along a photographic optical axis, said camera comprising:

a film motor arranged into said main body;

a film advance gear train for transmitting rotation of said film motor to said take-up spool;

a lens motor arranged into said main body;

a lens drive gear train for transmitting rotation of said lens motor to said movable lens barrel;

said film advance gear train and said lens drive gear train being arranged side by side on a lower surface of said main body.

2. A camera as claimed in claim 1, wherein said film advance gear train and said lens drive gear train respectively include plural gears, and each gear is rotatably attached to shafts provided perpendicular to said lower surface.

3. A camera as claimed in claim 2, wherein said film advance gear train and said lens drive gear train are covered by a gear cover to be secured to said main body.

4. A camera as claimed in claim 3, wherein said film motor is contained into said take-up spool, and said take-up spool is arranged perpendicular to said photographic optical axis.

5. A camera as claimed in claim 4, wherein said lens motor is arranged downward said main body in a state parallel to said photographic optical axis.

6. A camera as claimed in claim 5, wherein said lens drive gear train include a worm wheel to be engaged with a worm of said lens motor, plural spur gears, and a pair of bevel gears, and said pair of bevel gears changes rotatory center parallel to said photographic optical axis.

7. A camera as claimed in claim 6, wherein said main body has a capacitor chamber for containing a main capacitor, and a battery chamber for containing a power battery that supplies electricity to said lens motor and said film motor, and said capacitor chamber and said battery chamber are in line before and behind in a direction parallel to said photographic optical axis, and above an attachment position of said lens motor.

\* \* \* \* \*